United States Patent

[11] 3,610,724

| [72] | Inventor | William F. Frizzell<br>Woodbridge, Va. |
|---|---|---|
| [21] | Appl. No. | 834,634 |
| [22] | Filed | June 19, 1969 |
| [45] | Patented | Oct. 5, 1971 |
| [73] | Assignee | Potomac Research, Incorporated<br>Baileys Crossroads, Va. |

[54] PHOTOGRAPHIC DODGING APPARATUS
7 Claims, 3 Drawing Figs.

[52] U.S. Cl............................................ 355/80,
355/68, 355/81
[51] Int. Cl......................................... G03b 27/76
[50] Field of Search........................................ 355/80, 81, 67, 68

[56] References Cited
UNITED STATES PATENTS

| 2,691,917 | 10/1954 | Curry | 355/38 X |
| 2,928,327 | 3/1960 | Blackmer et al. | 355/81 |
| 3,036,497 | 5/1962 | Folse | 355/81 |
| 3,438,704 | 4/1969 | Schoen | 355/68 X |

FOREIGN PATENTS

| 790,683 | 2/1958 | Great Britain | 355/80 |

*Primary Examiner*—Samuel S. Matthews
*Assistant Examiner*—Richard M. Sheer
*Attorney*—Edmund M. Jaskiewicz ABSTRACT: A light beam of constant intensity is directed against a mirror galvanometer and the reflected through a photographic negative or positive against photosensitive printing material to expose the printing material. A photomultiplier is positioned in the path of the light to which the printing material is exposed. In response to the sensed light the galvanometer is actuated to move the mirror at a speed responsive to variation of density in the negative or positive so that the light beam will continuously scan across an elemental area of the negative or positive but at a varying speed. After each scan of the light beam in one direction a mechanical structure moves incrementally the galvanometer and light source in a direction perpendicular to the scanning movement of the light beam so that the next scan will be adjacent the previous scan. In this manner all elemental areas of the negative or positive will be exposed.

PATENTED OCT 5 1971 3,610,724
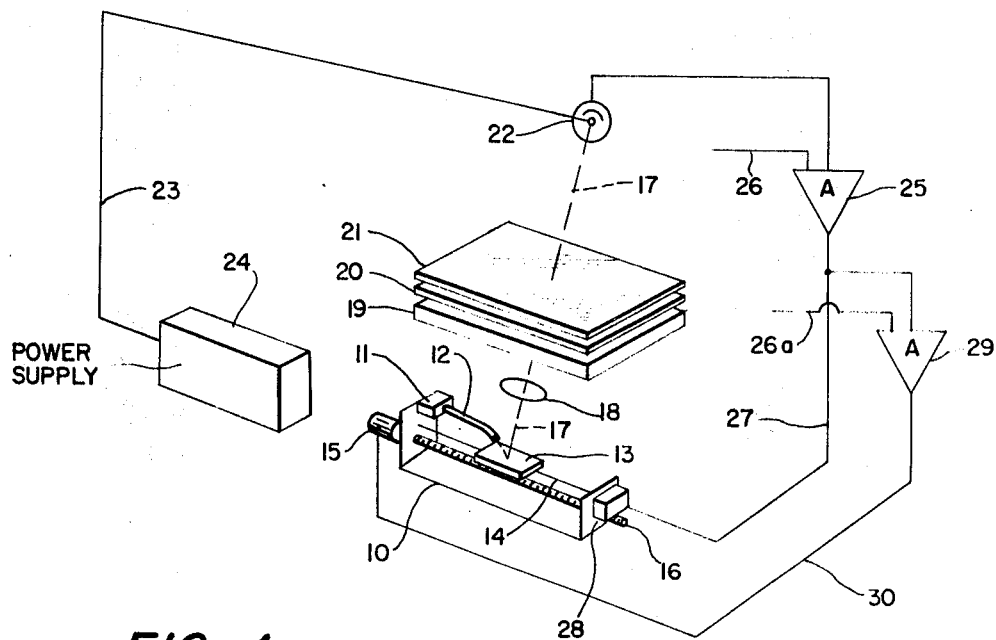
FIG. 1
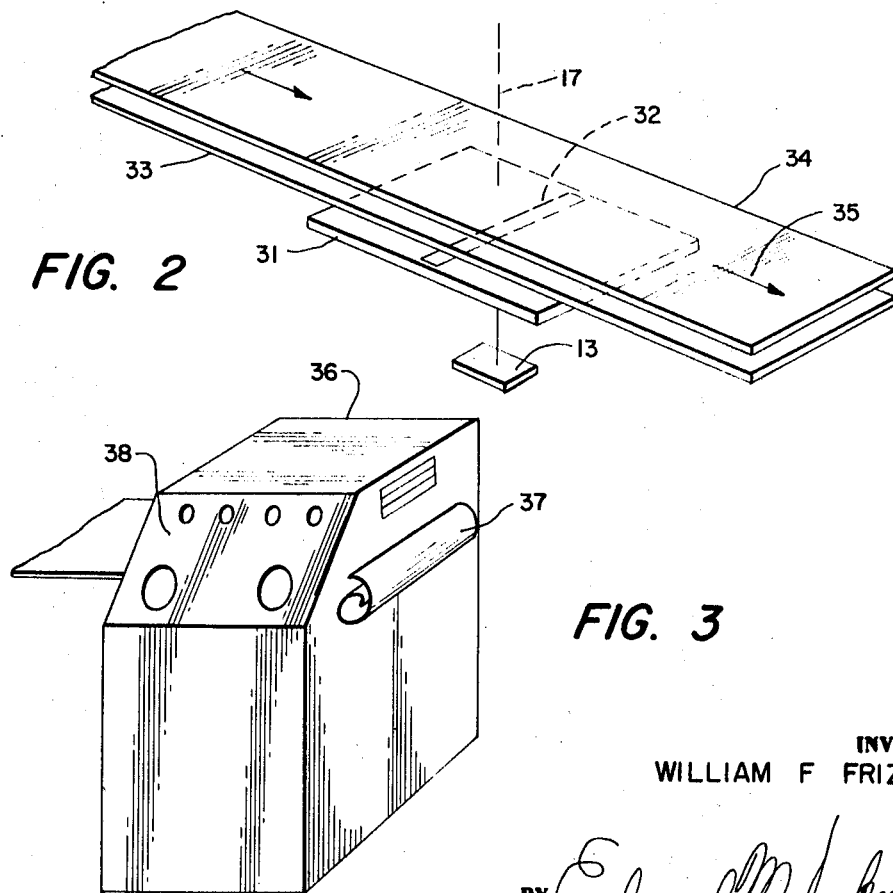
FIG. 2
FIG. 3
INVENTOR
WILLIAM F FRIZZELL
BY Edmund M. Jaskiewicz
ATTORNEYS

PHOTOGRAPHIC DODGING APPARATUS

The present invention relates to photographic printing, more particularly, to an apparatus and method for electromechanical dodging.

During the production of positive or negative prints or photographic reproductions it has been known to vary the intensity of the exposure source with respect to variations of density in the negative so as to compress effectively density differences in selected areas of the negative. This procedure has been generally designated as "dodging" and has particular application in the field of aerial photography. Aerial photographic negatives are generally characterized by wide density variation occurring in complex patterns which correspond to variations in the brightness of the areas to which the negative emulsion is exposed. The film employed in aerial photography is capable of recording in detail over the ranges of brightness encountered in aerial photographic exposure conditions. However, the printing materials relatively short exposure ranges and are not able to record detail in deep shadow areas and extreme highlight areas in the negative. As a result, much of the original detail recorded by the negative throughout the brightness range of exposure conditions is lost in the final reproduction.

Various forms of apparatus and methods have been devised for the automatic dodging of aerial photographs. A conventional form of electronic dodging apparatus varies the light intensity of a cathode tube light source in accordance with variations in the density of the negative in order to compensate within limits for varying densities in the negative. Another form of apparatus employs a light source of constant intensity which is intermittently moved over the negative so as to dwell on elemental areas thereof for a period of time varying on the density of that area of the negative. The use of cathode ray tubes as light sources are not generally satisfactory since they do not have uniform deposition of phosphor materials and as a result provide an uneven light source. This is readily apparent in color shifts in the final print when printing color materials. In addition, there is a limit on the maximum dwell of light from a cathode ray tube since a complete stop of this light may result in burning. Also, cathode ray tube light sources tend to be expensive and require complicated circuitry for sweeping, blanking, stepping and the like. In addition, the maximum amount of light available from a cathode ray tube is inherently limited by the nature of the phosphor used in its construction. The circuitry required for proper control of the cathode ray tube light to accomplish scanning of the photographic negative adds significantly to the cost of the apparatus and to problems of maintenance.

It is therefore the principal object of the present invention to provide a novel and improved apparatus and method for photographic dodging.

It is another object of the present invention to provide a photographic dodging apparatus having a simplified construction which is reliable and flexible in operation over long periods of time.

It is a further object of the present invention to provide a photographic dodging process which gives more accurate reproduction with a shorter operating time.

According to the present invention, a photographic printing apparatus may comprise a constant intensity light source for producing a light beam. In the optical path of the light beam means are provided for supporting the photographic negative or positive and printing material. Photoelectric sensing means are disposed in the path of the light to which the printing material is exposed. A mirror galvanometer reflects the light beam onto the photographic negative or positive and is movable at varying speeds in response to the photoelectric sensing means so that the beam scans across an elemental area at speeds varying according to the density of the photographic positive or negative. After each scan the structure for producing the light beam and providing the scanning movement of the light beam are moved incrementally in a direction perpendicular to the scanning movement so that all elemental areas of the negative or positive may be covered.

The printing method according to the present invention may comprise scanning a constant intensity light beam across an elemental area of a photographic negative or positive with printing material superimposed to expose the printing material. The scanning speed of the light beam is then varied according to the density of the photographic negative or positive.

Other objects and advantages of the present invention will be apparent upon reference to the accompanying description when taken in conjunction with the following drawings, which are exemplary, wherein:

FIG. 1 is a schematic perspective view of the printing apparatus according to the present invention;

FIG. 2 is a schematic view of only a portion of the apparatus of FIG. 1 as modified for printing of a strip of aerial film; and FIG. 3 is an overall perspective view of the housing enclosing the apparatus of the present invention.

Proceeding next to the drawings wherein like reference symbols indicate the same parts throughout the various views a specific embodiment and modifications of the present invention will be described in detail.

As may be seen in FIG. 1 the photographic printing apparatus comprises an incremental transport assembly or carriage 10 upon which is mounted a constant intensity light source 11 which may comprise an incandescent tungsten standard enlarger bulb or lamp, laser, a cathode ray tube light of a light source employing electroluminescence. In order to obtain a pinpoint source of light there is provided a fiber optic bundle 12 in the form of a coherent or inherent light pipe. The fiber optic bundle directs a pinpoint of light onto a galvanometer mirror 13 mounted on a pair of galvanometer wires 14 in the transport assembly 10. The reflecting mirror 13 constitutes the moving element of a galvanometer and is rotatable through an angle of about 180°.

The transport assembly 10 is advanced by an electric motor 15 which rotates a drive screw 16 upon which the assembly is mounted. Driving of the transport assembly may also be accomplished by a hydraulic motor or by a gear train or a stepping motor, or any combination of the above.

The light beam is reflected from the mirror 13 as indicated at 17 and passes through a suitable lens assembly 18 through a transparent supporting printing stage 19 upon which are positioned a photographic negative 20 and printing material 21 in the form of a photosensitive sheet. The negative and printing material are held stationary by a transparent pressure platen which may comprise a removable air bag or vacuum frame.

The size of the spot formed by the light beam 17 on the negative and printing material is varied by the lens assembly 18 in order to obtain the desired degree of incremental area of the negative with this area being in the form of a thin strip having a length equal to the width of the negative and a width equal to the diameter of the spot size. The size of the spot formed by the light beam can be varied over a wide range and can be considered to be infinite.

A stationary photomultiplier tube 22 is mounted in the optical path of the scanning light beam 17 so as to be responsive to the light passing through the photographic materials and to which the printing material is exposed. Where the negative measures about 9 inches × 9 inches, the tube 22 is positioned about 5 inches away as shown in FIG. 1. The photomultiplier tube is electrically connected at 23 to a power supply 24 which may be −1000 volts DC.

The output of the photomultiplier tube is connected to an operational amplifier 25 which is connected to a suitable power supply at 26 which may be ±12 volts DC. The operation amplifier has suitable outputs for the circuitry involved and may be a prepackaged item such as ZELTEK model Zel-1 manufactured by Zeltek. The output of amplifier 25 is connected at 27 to the galvanometer assembly 28.

A second operational amplifier 29, similar to amplifier 25, is connected to the output of amplifier 25 and to a suitable power supply at 26a. Amplifier 29 has its own output connected at 30 to the transport drive motor 15. This amplifier 29 is actuated at the end of each scan of the beam 17 so as to move the transport assembly an incremental distance equal to the width of the scanning beam.

During the printing process the light beam is scanned across the negative in one direction and then scanned back in the opposite direction. This scanning is continued until the entire area of the negative is covered. The speed of the scanning is determined by the speed at which the mirror 13 is rotated. The speed at which the mirror rotates and thus the speed of the scanning beam will vary as the density of the negative. These variations in density are sensed by the photomultiplier tube the output of which controls the speed of movement of the mirror.

After the beam scans across the negative in one direction the transport assembly is advanced by the amplifier 29 in a direction perpendicular to the movement of the scan. This advance of the transport assembly is set by the operator before commencing the printing operation and generally depends on the emulsion used and the spot size desired.

The use of a standard incandescent enlarger lamp for the light source instead of a cathode ray tube provides several advantages. The spot of light in the present invention can be completely stopped without any detrimental effects to the system. Further, there is no phosphor decay nor is there any irreversible phosphor destruction. In addition, the present printing apparatus is compatible for both color and black and white with the same light source. This is not feasible with a cathode ray tube. Since the beam of light in the present apparatus can come to a complete stop without any burning there is no limitation on dwell or minimum speed of scan. Also, the light intensity can be increased several orders of magnitude over that light available from the best cathode ray tubes. This increased the higher density dynamic range.

The cost of the standard light source of the present invention is significantly less than the cost of a cathode ray light source in the existing state of the art. No filament warmup is required as compared to the usual warmup time of about 30 seconds for a cathode ray tube. The actual form of the light source is immaterial as long as a light beam is formed. In general, any type of light generator may be used.

The present invention may be also used for continuous roll negative or positive printing and is particularly applicable, as indicated in FIG. 2, to a roll of standard aerial film having approximately the same density from frame to frame.

The apparatus may be modified slightly in that a printing stage 31 may be opaque and is provided with a transverse slot 32 through which the light beam 17 is scanned. The scanning mechanism is not moved but the negative 33 and the printing material 34 may both be moved as indicated by the arrow 35. The strip moves continuously past the scanning beam aperture 32 at a constant speed which is predetermined by the operator. The speed of the scan still varies according to the teaching of this invention but is at such a high speed that the scan appears to be a continuous line. The frequency of the scan may vary from 1–15,000 cycles per second.

In FIG. 3 there is shown a housing 36 which encloses the present invention with the housing being provided with a roll 37 upon which the film strips shown in FIG. 2 may be wound at the completion of the printing operation. The several parameters of the printing apparatus may be varied by the controls on an instrument panel 38.

Thus it can be seen that the present invention has disclosed an electromechanical dodging or incremental exposure control apparatus. The apparatus comprises a standard enlarger bulb or incandescent or electroluminescence constant intensity light source instead of the conventional cathode ray tube. The use of an incandescent light source results in a more simplified apparatus having greatly improved flexibility and dependability.

It will be understood that this invention is subject to modification in order to adapt it to different uses and conditions.

What is claimed is:

1. In a photographic printing apparatus, the combination of means for producing a constant intensity light beam, means in the optical path of said light beam for supporting a photographic negative or positive and printing material, photoelectric sensing means in the path of the light to which the printing material is exposed, mirror galvanometer means for scanning said light beam across an elemental area of said negative or positive, means responsive to said photoelectric sensing means for varying the speed of said light beam scanning means according to the density of the photographic positive or negative, a movable carriage upon which said mirror galvanometer and light beam producing means are mounted, and means drivingly connected to said carriage to move said carriage incrementally in a direction perpendicular to the scanning movement.

2. In an apparatus as claimed in claim 1 wherein said light beam moves continuously during each scan but at varying speeds.

3. In an apparatus as claimed in claim 1 wherein said means for moving said scanning means is responsive to said photoelectric sensing means.

4. In an apparatus as claimed in claim 1 wherein said negative or positive is a sheet retained on said supporting means.

5. In an apparatus as claimed in claim 1 wherein said negative or positive is a strip moved continuously upon said supporting means in a direction perpendicular to the scanning movement.

6. In an apparatus as claimed in claim 1 wherein said incremental distance is the width of the elemental area exposed to the light beam.

7. In a photographic printing apparatus, the combination of means for producing a constant intensity light beam, means in the optical path of said light beam for supporting a photographic negative or positive and printing material, photoelectric sensing means in the path of the light to which the printing material is exposed, mirror galvanometer means for scanning said light beam across an elemental area of said negative or positive, means responsive to said photoelectric sensing means for varying the speed of said light beam scanning means a according to the density of the photographic positive or negative, said light beam producing means comprises a constant intensity light source and a fiber optic bundle to direct light onto said mirror galvanometer means whereby a light beam is reflected therefrom.